US012769709B1

(12) United States Patent
Chen et al.

(10) Patent No.: US 12,769,709 B1
(45) Date of Patent: Oct. 20, 2026

(54) OPTIMIZE DATA PLACEMENT IN PARALLEL FILE SYSTEMS USING LOCALITY SENSITIVE HASHING

(71) Applicant: Dell Products L.P., Round Rock, TX (US)

(72) Inventors: Xiangping Chen, Sherborn, MA (US); Jonathan Ichael Krasner, Coventry, RI (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/248,223

(22) Filed: Jun. 24, 2025

(51) Int. Cl.
*G06F 16/18* (2019.01)
*G06F 16/13* (2019.01)

(52) U.S. Cl.
CPC ........ *G06F 16/1858* (2019.01); *G06F 16/137* (2019.01)

(58) Field of Classification Search
CPC ........................... G06F 16/1858; G06F 16/137
See application file for complete search history.

(56) References Cited

U.S. PATENT DOCUMENTS

| | | | | |
|---|---|---|---|---|
| 10,083,231 | B1 * | 9/2018 | Kochura | G06F 40/268 |
| 12,367,101 | B1 * | 7/2025 | Sinnamohideen | G06F 11/1076 |
| 12,487,967 | B1 * | 12/2025 | Shinde | G06F 16/152 |
| 2014/0344195 | A1 * | 11/2014 | Drew | G06F 16/35 706/12 |
| 2020/0177942 | A1 * | 6/2020 | Wu | G06F 16/3347 |
| 2025/0232006 | A1 * | 7/2025 | Lindsey | G06F 18/15 |

OTHER PUBLICATIONS

Jia M, Mao X, Guo S, Li X. Retrieval algorithm based on locally sensitive hash for ocean observation data. Frontiers in Marine Science. Jun. 18, 2025;12:1534900. (Year: 2025).*

Manek M, Chhadwa A, Shah K, Potey M, Khan M. Cloud Oriented Distributed and Encrypted File Storage (CODE-FS). In2018 Fourth International Conference on Computing Communication Control and Automation (ICCUBEA) Aug. 16, 2018 (pp. 1-5). IEEE. (Year: 2018).*

(Continued)

*Primary Examiner* — Mohsen Almani
(74) *Attorney, Agent, or Firm* — Chamberlain, Hrdlicka, White, Williams & Aughtry; Aly Z. Dossa

(57) ABSTRACT

A method for storing data in a parallel file system (PFS) including receiving a plurality of key value entries created by an artificial intelligence (AI) application. Moreover, the method includes calculating a plurality of locality sensitive hash values for the plurality of key value entries. The method includes creating a distribution of the plurality of key value entries based on the plurality of locality sensitive hash values. Additionally, the method includes storing the plurality of key value entries in a plurality of components of the PFS based on the distribution. After storing a first key value entry, the method includes receiving a load request for the first key value entry. Further, the method includes making a first determination that the first key value entry is stored in a first component. Finally, the method includes loading a first portion of the plurality of key value entries stored in the first component.

20 Claims, 5 Drawing Sheets

(56) References Cited

OTHER PUBLICATIONS

Pawar, Rutuja Shivraj. An evaluation of deep hashing for high-dimensional similarity search on embedded data. MS thesis. Otto von Guericke University Library, Magdeburg, Germany, 2019. (Year: 2019).*
Baraian I, Valean H, Matei O, Erdei R. Similarity-Based Decision Support for Improving Agricultural Practices and Plant Growth. Applied Sciences. Jun. 19, 2025;15(12):6936. (Year: 2025).*
Liu M, Rabbani T, O'Halloran T, Sankaralingam A, Hartley MA, Huang F, Fermüller C, Aloimonos Y. Hashevict: A pre-attention kv cache eviction strategy using locality-sensitive hashing. arXiv preprint arXiv:2412.16187. Dec. 13, 2024.*
Tian, Yao, et al. "Approximate Nearest Neighbor Search in High Dimensional Vector Databases: Current Research and Future Directions." IEEE Data Eng. Bull. 3 (2023): 39-54. (Year: 2023).*

* cited by examiner

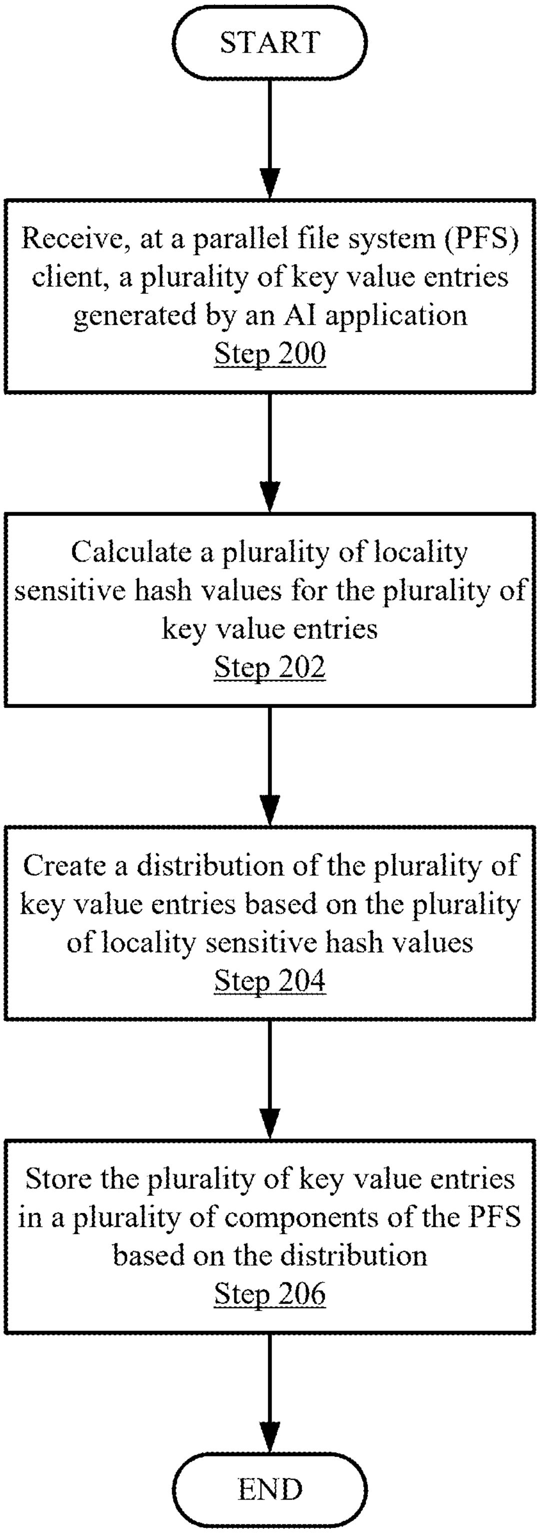
*FIG. 2.1*

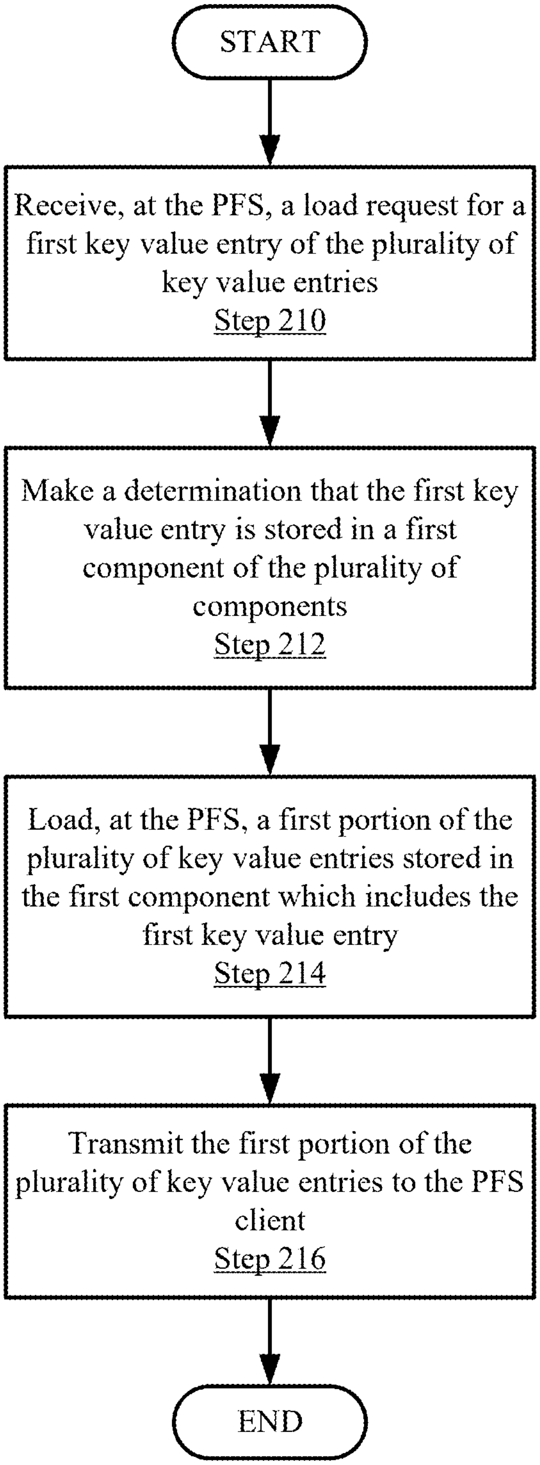
*FIG. 2.2*

OPTIMIZE DATA PLACEMENT IN PARALLEL FILE SYSTEMS USING LOCALITY SENSITIVE HASHING

BACKGROUND

High performance parallel file systems (PFSs) are used in large model artificial intelligence (AI) training and during inferencing tasks with the trained AI models. The PFSs are used to access large amounts of data at a low latency (e.g., time for input/output (I/O) requests to be fulfilled) and to scale to demand of I/O requests. The PFSs achieve high performance by sharding data and metadata to data/metadata server clusters. For example, a PFS is formed with many smaller component file systems with one or multiple component file systems hosted by a metadata server node.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 2.1 shows a flowchart for a method for storing data in a parallel file system (PFS) in accordance with one or more embodiments disclosed herein.

FIG. 2.2 shows a flowchart for a method for loading data stored in a parallel file system in accordance with one or more embodiments disclosed herein.

DETAILED DESCRIPTION

In traditional PFSs, file sharding among component file systems (e.g., components) in the PFSs is based on random distribution. For example, by cyclic redundancy check values or by the file name. The data placement based on the file sharding therefore has no consideration for contextual relevance of the data. These PFSs also cannot be optimized for small partial file block input/output (I/O) requests. Emerging artificial intelligence (AI) workloads such as graph databases and key value caches requires vast amount of data to be accessed at near memory speed. Tiering provides a solution to balance performance and cost by putting hot (e.g., frequently used) data on a high-performance tier and cold (e.g., infrequency used) data in a capacity tier. Prefetching from lower tier to the higher performance tier in the PFS minimizes the data access latency to the lower tier and preserves the high-performance tier for AI training and inferencing. However, there are two issues with tiering prefetching. Misprediction (e.g., prefetching the incorrect data) and too aggressive prefetching adds overhead to the workload of the PFS. Small size key value cache I/O requests trigger read/write amplification as the I/O sizes are usually smaller than block size in the PFS and can therefore cause performance overhead. For at least the reasons discussed above, a different approach may be beneficial.

Embodiments disclosed herein relate to storing key value entries in a PFS in groups to assist in I/O requests. The method includes file data sharding based on locality-sensitive hashing (LSH) to store similar data together in components of the PFS using a LSH accelerator and a PFS client on an AI application server. Based on the LSH, the metadata of the stored data is locality optimized (e.g., similar data is stored together) on the PFS servers allowing for data mapping caching of the stored data. The PFS client allows for data retrieval and prefetch caching optimization. AI models such as large language models (LLMs) require training and inferencing that heavily relies on similarity searching to locate contextual relevant data for content generation. The key values for the AI models are small data blocks leading to small I/O sizes. If these key value entries are stored in different component file systems based on LSH for prefetching, the key value entries could then be grouped together. Then, the key value entries small I/O requests can be batched to similar key value entries to form larger I/O requests improving data access performance when prefetching.

The following describes various embodiments disclosed herein.

Figure 1:
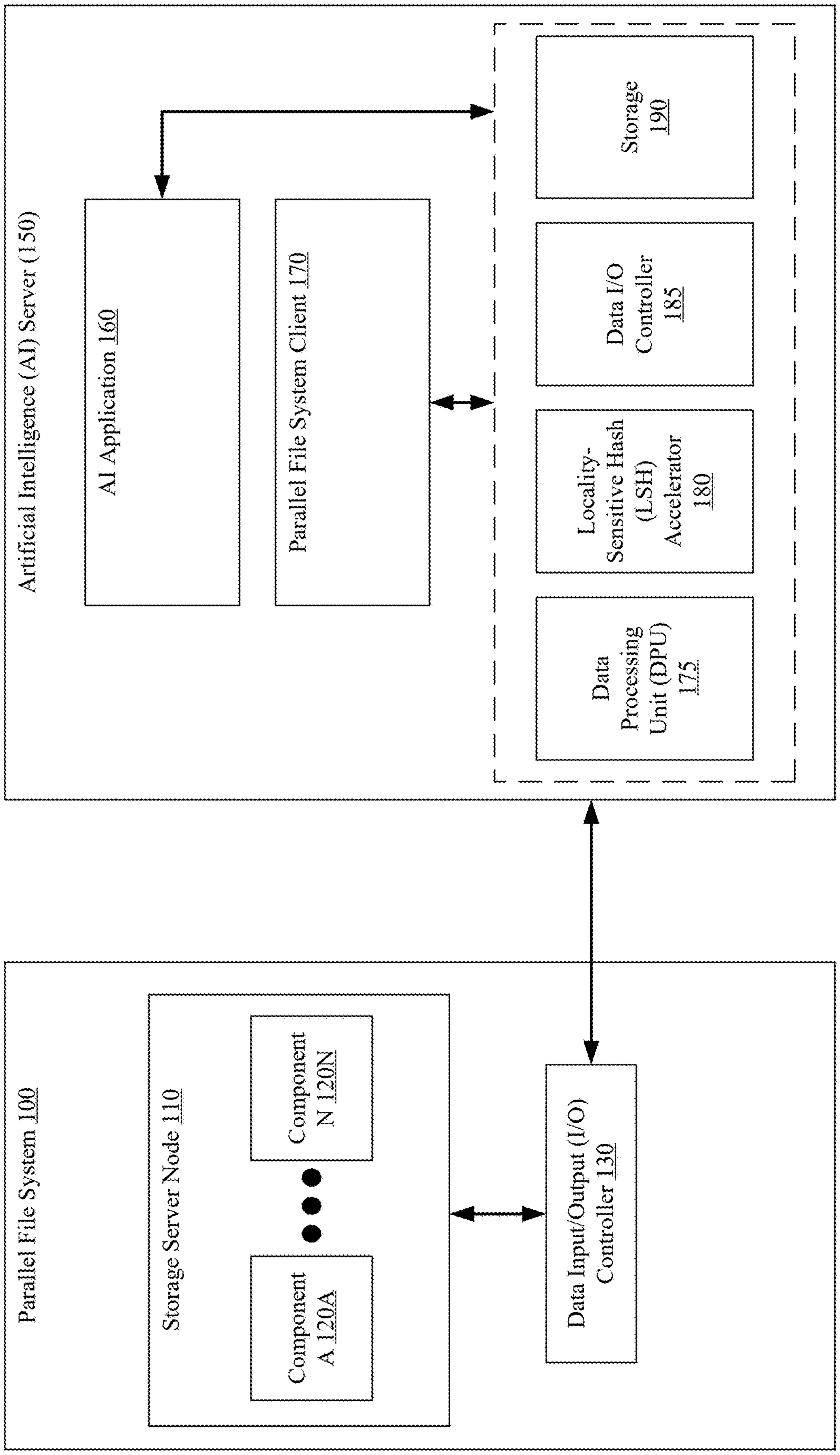
FIG. 1 shows a diagram of a system in accordance with one or more embodiments disclosed herein.

FIG. 1 shows a diagram of a system in accordance with one or more embodiments disclosed herein. The system includes a parallel file system (PFS) (100), operatively connected to an artificial intelligence (AI) server (150). Each of these components shown in FIG. 1 is described below.

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the disclosure.

The PFS (100) includes a storage server node (110) and a data input/output (I/O) controller (130). The PFS (100) includes functionality to store AI data from the AI server (150) for AI model training and AI inferencing in the PFS (100). In one or more embodiments, the AI data is key value entries used by AI applications. A key value entry is a pair of data including a key which is a unique identifier such as a string, number, token, etc. that is associated with a value which is data associated to the key such as a string, number vector, or more complicated data such as an image, document, array, nested structure, etc. For example, a key could be a product represented by the product identification number and the value could be the details of the product like the name, price, size, description, etc.) In one or more embodiments, PFS (100) may be implemented as a file store. When implemented as a file store, the PFS (100) stores data as files and manages the files. The PFS (100) may organize the files within a hierarchy using, for example, directories, indexes, and/or folders.

The storage server node (110) includes a plurality of components (120A, 120N). The plurality of components may include a component A (120A), a component N (120N), and any other number of components. The storage server node (110) includes functionality to store key value entries in the plurality of components (120A, 120N) based on a distribution created by LSH of the key value entries. The storage layout of the storage server node (110) includes assigning each component of the plurality of components (120A, 120N) a similarity hash bucket value (e.g., a range of LSH values). Key value entries are stored in the component with the similarity hash bucket value that corresponds to the LSH value of the key value entry.

The key value entries are transmitted from the AI server (150) to the storage server node (110) via the data I/O controller (130). The data I/O controller (130) manages the transfer of data to the PFS (100) (e.g., write requests for data to be stored on the PFS (100)) and the transfer of data from the PFS (100) (e.g., read requests for data to be retrieved from the PFS (100)).

In one or more embodiments, the storage server node (110) includes a plurality of storage nodes for different tiers of data. The storage server nodes are set up as physically networked storage resource pool. The different tiers include a high-performance storage tier that has limited physical capacity prioritizing latency of the data and lower tier storage with a larger physical capacity for storing more data. In one or more embodiments, the storage node for storing key value entries is a low tier storage that enables pre-fetching of the key value entries for the AI application. In one or more embodiments, the PFS (100), storage server node(s) (110) and the components (120A, 120N) are set up according to a service level agreement of the user of the AI application to conform with performance and capacity parameters.

Figure 4:
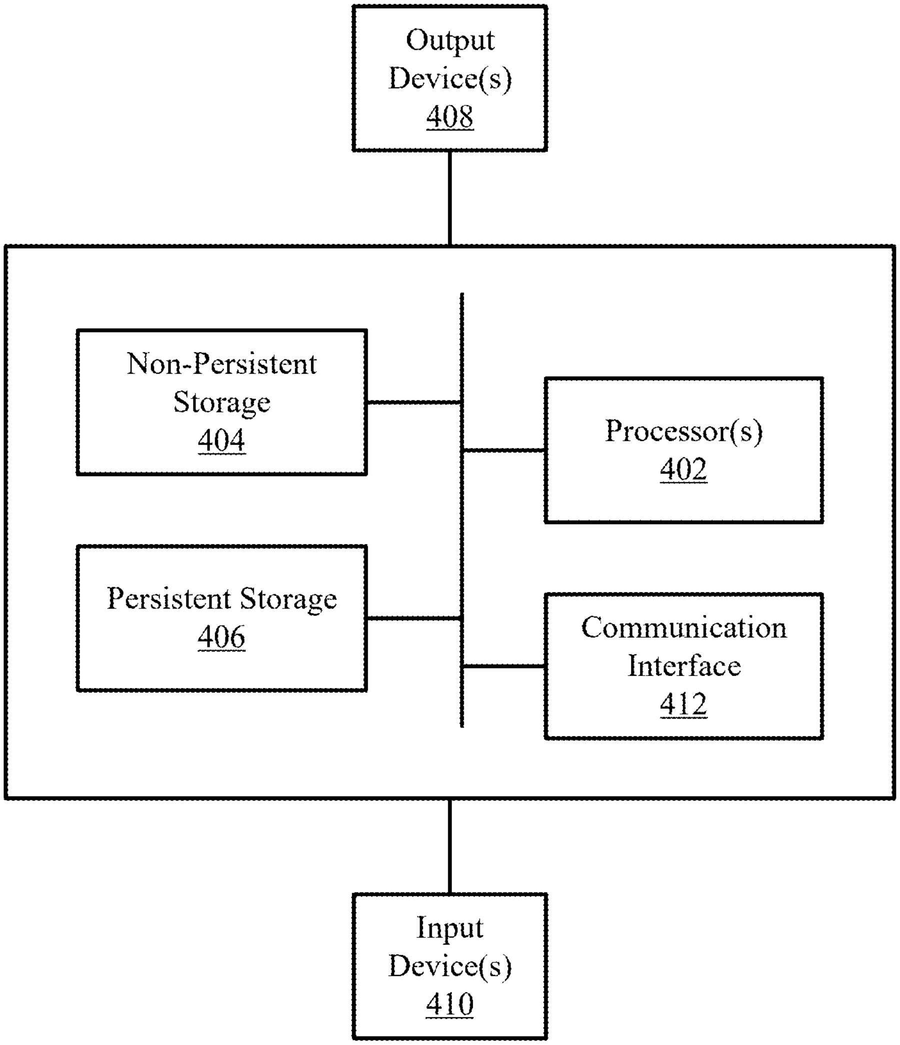
FIG. 4 shows a diagram of a computing device in accordance with one or more embodiments disclosed herein.

In one or more embodiments, the PFS (100) may be implemented as one or more computing devices (see e.g., FIG. 4). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the PFS (100) described throughout this application and/or all, or a portion thereof, of the methods illustrated in FIGS. 2.1-2.2. The PFS (100) may utilize, to store data, volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), and persistent memory (PMEM).

In one or more embodiments, the PFS (100) is implemented as a logical device(s). Each logical device may utilize the computing resources of any number of computing devices and thereby provide the functionality of the PFS (100) described throughout this application and/or all, or a portion thereof, of the methods illustrated in FIGS. 2.1-2.2.

The AI server (150) includes software and hardware components. The software components include an AI application (160) and a PFS client (170). The hardware components include a data processing unit (DPU) (175), a locality-sensitive hash (LSH) accelerator (180), a data I/O controller (185), and a storage (190). The AI server (150) includes functionality for the AI application (160) to execute on the AI server (150). In one or more embodiments, the AI application (160) is trained on the AI server (150). In one or more embodiments, the AI application (160) performs inferences based on prompts inputted into the AI application (160). The AI application (160) may be executed on a central processing unit (CPU) (not shown) and/or graphical processing unit (GPU) (not shown) environment. The AI application (160) may be a large language model. As a large language model, the AI application (160) uses key value entries for training and inferencing. The AI application (160) is operatively connected to the hardware components of the AI server (150). In one or more embodiments, the AI application (160) may be a plurality of AI applications executing on the AI server (150).

The PFS client (170) is connected to the AI is configured to store and retrieve data such as key value entries on the PFS (100). The PFS client (170) is connected to the PFS (100), and the hardware components of the AI server (150). The PFS client (170) retrieves key value entries created by the AI application (160), facilities locality-sensitive hashing of the key value entries to create a distribution and causes the key value entries to be stored in the plurality of components (120A, 120N) based on the distribution. The PFS client (170) then may retrieve the key value entries in particular components to be reused by the AI application (160) saving the computational resources needed to recreate the key value entries.

The DPU (175) is a specialized electronic component that includes one or more network interfaces and is designed to offload various networking tasks (e.g., packet processing, encryption, data compression, and network virtualization) from a CPU (not shown) of the PFS (100). The DPU A (105A) includes a DPU compression agent A (106A). The DPU (175) may be used by the PFS client (170) to perform computing tasks related to the locality-sensitive hashing of the key value entries and storing the key value entries in the PFS (100). The DPU (175) may operate a storage proxy (e.g., storage (190)) to access data for the AI application (160). The DPU (175) includes functionality to manage data transfers to the different storage tiers in the PFS (100) and the storage (190) in the AI server (150). The DPU (175) is operatively connected to the storage tiers (e.g., storage server node(s) (110) of the PFS (100) and the storage (190).

The LSH accelerator (180) is a hardware accelerator to generate LSH values for the key value entries or other data for the PFS client (170). The LSH accelerator (180) is a dedicated hardware component that is designed to use multiple LSH hash functions to assign LSH values to key entries. The LSH values are similarity hashing values that determine if data is similar to other data. Two similar data inputs (e.g., key value entries) into the LSH hash functions will generate two similar LSH values for the two similar data inputs. Further, in one or more embodiments, the LSH accelerator (180) includes a software compression accelerator. The software compression accelerator includes software that is designed to take advantage of the logical construction and/or physical construction of the LSH accelerator (180) to generate LSH values for data. Once the PFS client (170) via the LSH accelerator (180) assigns all the key value entries subject to a storage request LSH values, the key value entries are grouped in a distribution to be stored in components (120A, 120N) of the PFS (100) based on the LSH values. Therefore, the components (120A, 120N) of the PFS (100) are hash buckets, designed to have a range of LSH bucket values. The key value entries are therefore stored in the component corresponding to the key value entries LSH value.

The data I/O controller (185) manages the transfer of data to the PFS (100) (e.g., write requests for data to be stored on the PFS (100)) and the transfer of data from the PFS (100) (e.g., read requests for data to be retrieved from the PFS (100)). The storage (190) is a local storage of the AI server (150). In one or more embodiments, the storage (190) includes one or more virtualized storage instances set up based on the service level agreement of the user to improve performance, capacity, etc. These virtualized storage instances may be set up for an AI workload of each AI application (160). In one or more embodiments, the storage (190) includes separate virtualized storage instances for different tiers of data from the AI application (160). The different tiers include a high-performance storage tier that has limited physical capacity prioritizing latency of the data and lower tier storage with a larger physical capacity for storing more data. In one or more embodiments, the storage node for storing key value entries is a low tier storage that enables pre-fetching of the key value entries from the storage (190) for the AI application (160).

In one or more embodiments, the AI server (150) may be implemented as one or more computing devices (see e.g., FIG. 4). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the AI server (150) described throughout this application and/or all, or a portion thereof, of the methods illustrated in FIGS. 2.1-2.2.

In one or more embodiments, the AI server (150) is implemented as a logical device(s). Each logical device may utilize the computing resources of any number of computing devices and thereby provide the functionality of the AI server (150) described throughout this application and/or all, or a portion thereof, of the methods illustrated in FIGS. 2.1-2.2.

Turning now to FIG. 2.1, FIG. 2.1 shows a flowchart for a method for encrypting data in a storage array in accordance one or more embodiments disclosed herein. The method of FIG. 2.1 may be performed by, for example, the PFS client (e.g., 170, FIG. 1) and the PFS (e.g., 100, FIG. 1). Other components of the system of FIG. 1 may perform all, or a portion, of the method of FIG. 2.1 without departing from the disclosure.

While the various steps in the flowcharts of FIGS. 2.1-2.2 are presented and described sequentially, one of ordinary skill in the relevant art will appreciate that some or all of the steps may be executed in different orders, may be combined, or omitted, and some or all steps may be executed in parallel.

In Step 200, the PFS client receives a plurality of key value entries generated by an AI application (e.g., 160, FIG. 1). The PFS client retrieves the key value entries from a storage (e.g., 190, FIG. 1) on the AI server (e.g., 150, FIG. 1) that contains the PFS client and the AI application. In one or more embodiments, the key value entries may be stored on the storage for prefetching for the AI application and the PFS client retrieves the key value entries for storage due to a downtime in the AI application. The AI application may use the key value entries during an AI inferencing operation. The AI application stores the key value entries in the storage from where the PFS client receives the plurality of key value entries. In one or more embodiments, the AI application stores the key value entries in the storage as the key value entries are created by the AI application. In one or more embodiments, the PFS client receives a request to store the key value entries in the PFS (e.g., 100, FIG. 1) prior to receiving the plurality of key value entries. The key value entries are stored to avoid recalculating the key value entries in future operations of the AI application. In one or more embodiments, the plurality of key value entries are stored in the storage as single data set and the PFS client shards the data set into key value entries upon receiving the data set of the plurality of key value entries. For example, the plurality of key value entries include a first key value entry, a second key value entry, a third key value entry, and a fourth key value entry.

In Step 202, the LSH accelerator (e.g., 180, FIG. 1) calculates a plurality of locality sensitive hash values for the plurality of key values entries for the PFS client. A plurality of LSH functions are used to generate LSH values for each key value entry. The plurality of locality sensitive hash values identifies similar key value entries in the plurality of key value entries by assigning the similar LSH values. The PFS client uses the locality-sensitive hash values to group the key value entries together. Returning to the example, the first key value entry and the second key value entry are assigned LSH values that are similar. The third key value entry and the fourth key value entry are assigned LSH values that are similar to each other but different to the first key value entry and the second key value entry.

In Step 204, the PFS client creates a distribution of the plurality of key value entries based on the plurality of locality sensitive hash values. The distribution identifies which key values should be stored together. The distribution groups key value entries with similar LSH values together to be stored together. Returning to the example, the distribution groups the first key value entry and the second key value entry together and groups the third key value entry and the fourth key value entry together.

In Step 206, the PFS client stores the plurality of key value entries in a plurality of components (e.g., 120A, 120N, FIG. 1) of the PFS. The PFS client effectuates the storage of the plurality of key value entries using the data I/O controllers (e.g., 130, 185, FIG. 1) of the PFS and the AI server. The plurality of key values are stored in the plurality of components according to the distribution. Each component of the plurality of components is a hash bucket with an assigned range of LSH bucket values. The distribution is set up to group the key value entries to the range of LSH bucket values which the LSH values of the key value entries correspond. Returning to the example, based on the assigned range of LSH bucket values of the components and the LSH of the key value entries, the first key value entry and the second key value entry are stored in a first component of the PFS, and the third key value entry and the fourth key value entry are stored in a second component of the PFS. After Step 206, the method may end or be repeated to store new key value entries.

Turning now to FIG. 2.2, FIG. 2.2 shows a flowchart for a method for encrypting data in a storage array in accordance one or more embodiments disclosed herein. The method of FIG. 2.2 may be performed by, for example, the PFS (e.g., 100, FIG. 1). Other components of the system of FIG. 1 may perform all, or a portion, of the method of FIG. 2.2 without departing from the disclosure.

In Step 210, the PFS receives a load request for a first value entry of the plurality of key value entries. The load request is initiated by the PFS client (e.g., 170, FIG. 1). In one or more embodiments, the AI application needs the first value entry for an AI inference or AI training operation and can avoid recalculation of the first key value entry by retrieving the key value entry from the PFS. The load request may include the LSH value of the first key value entry for identification.

In Step 212, the PFS makes a determination that the first key value entry is stored in a first component of the plurality of components. The PFS may make the determination by comparing the LSH value of the first key value entry to the range of LSH bucket values of each component of the plurality of components (e.g., 120A, 120N) of the PFS to determine in which component the first key value entry is stored. The PFS determines that the first key value entry is stored in the first component.

In Step 214, the PFS loads a first portion of the plurality of key value entries stored in the first component. The PFS does not need to identify which key value entry is the first key value entry instead loading all key value entries stored in the first component (e.g., a first portion). This reduces the latency as processing time for identifying the first key value entry in the first component is eliminated. Further, the load request for a single key value (e.g., the first key value) is a small I/O request. By loading all the data (e.g., similar key value entries) stored in the component based on the LSH values the read/write amplification is minimized as the load is not a small I/O operation improving the performance overhead of the operation. For a second example, the first portion includes the first key value entry and a second key value entry.

In Step 216, the PFS transmits the first portion of the plurality of key value entries to the PFS client. The PFS effectuates the transfer of the first portion using the data I/O controllers (e.g., 130, 185, FIG. 1) of the PFS and the AI server (e.g., 150, FIG. 1). The first portion is then stored in the storage (e.g., 190, FIG. 1) of the AI server for use in the AI application. In one or more embodiments, the first portion is stored in a local in-memory prefetch cache of the storage as a prefetch of the data for the AI application. A subsequent similarity search can be performed in the local in-memory prefetch cache for specific key value entries for the AI application contributing to the minimization of the read/write amplification cost. Returning to the second example, the first key value entry and a second key value entry are stored in the storage for use by the AI application.

After Step 216, the method may be repeated to load key value entries in other components of the PFS. Returning the second example, a third key value entry and as fourth key value entry are stored in a second component of the PFS. A second load request is made for the third key value entry. A second portion formed from the second load request includes the third key value entry and the fourth key value entry which are then stored in the storage for use by the AI application. Alternatively, the method may end.

Figure 3:
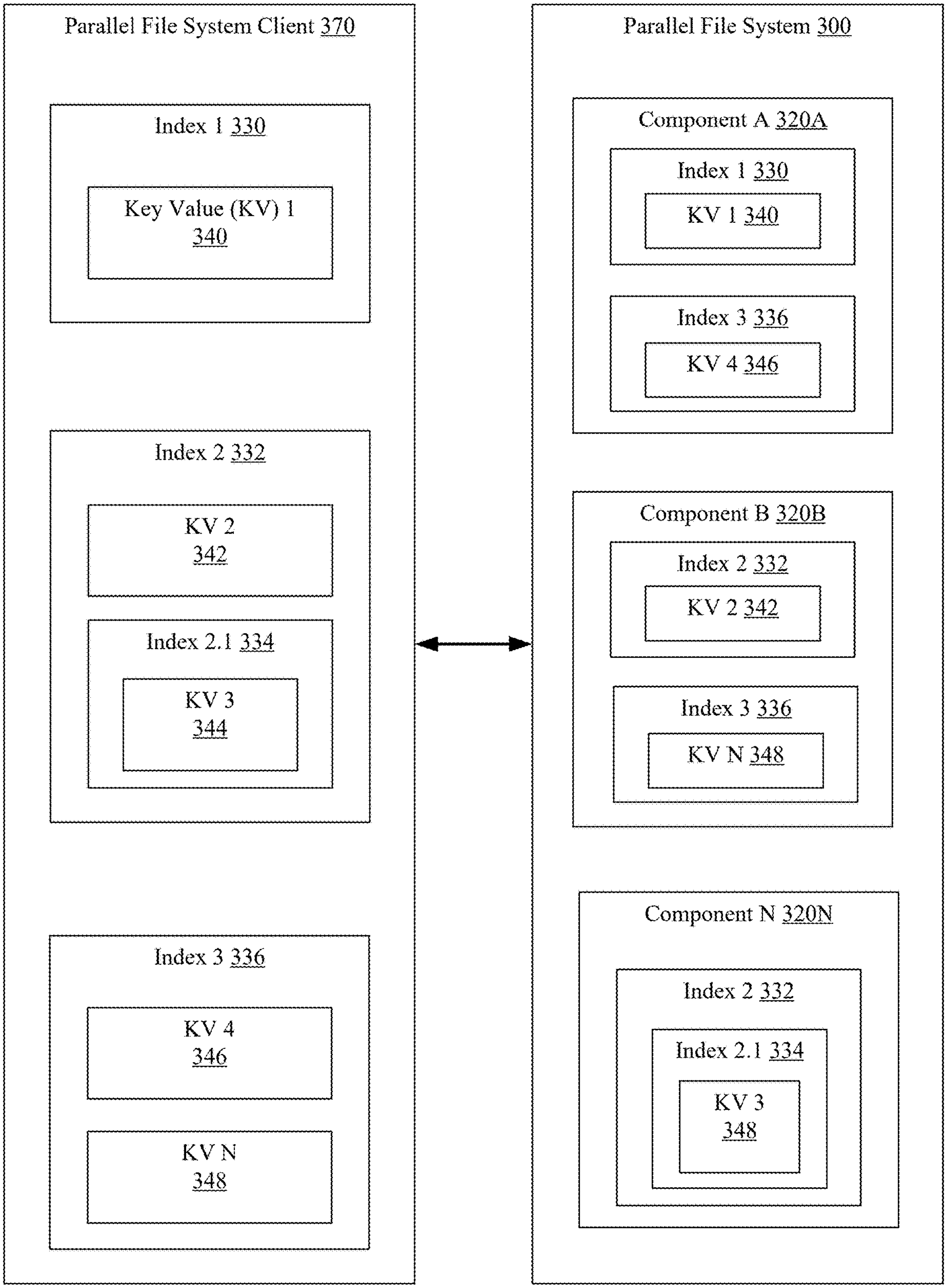
FIG. 3 shows an exemplary diagram of data stored in a parallel file system in accordance with one or more embodiments disclosed herein.

FIG. 3 shows an exemplary diagram of data stored in a parallel file system (PFS) (300) in accordance one or more embodiments disclosed herein. The diagram shows a PFS client (370) operatively connected to the PFS (300). The PFS client (370) shows the data as received from an AI application as shown in Step 200 of FIG. 2.1. In one or more embodiments, the PFS client (370) obtains the data from a storage (not shown) operatively connected to both the PFS client (370) and the AI application. The data in the PFS client (370) is key values broken up into indexes. The indexes include Index 1 (330), Index 2 (332), and Index 3 (336). The Index 1 (330) includes a Key Value (KV) 1. The Index 2 (332) includes a KV 2 (342) and a sub-index, Index 2.1 (334). The Index 2.1 includes a KV 3 (344). The Index 3 (336) includes a KV 4 (346) and a KV N (348). The indexes also group similar key value entries together (e.g., an index contains key value entries that are similar to each other and would have similar LSH values). In one or more embodiments, the index is a subset of a single group of similar LSH values shown in FIG. 2.1.

The PFS (300) shows the data stored as illustrated in Step 206 of FIG. 2.1. As described above, the data is stored according to a distribution based on locality sensitive hash values assigned to each key value. The distribution determines which component of the plurality of components each key value is stored. The PFS (300) includes a component A (320A), a component B (320B), and a component N (320N). The component A (320A) contains the KV 1 (340) and the KV 4 (344). The KV 1 (340) is stored in the index 1 (330) and the KV 4 is stored in the index 3 (336). The KV 1 (340) and the KV 4 (348) are stored together based on similarities in the locality sensitive hash values of each KV. The component B (320B) contains the KV 2 (342) and the KV N (348). The KV 2 (342) is stored in the index 2 (332) and the KV N (348) is stored in the index 3 (336). The KV 2 (342) and the KV N (348) are stored together based on similarities in the LSH of each KV. The component N (320N) contains the KV 3 (344). The KV 3 (344) is stored in the index 2 (332) and index 2.1 (334). The KV 3 (344) is stored separately due to dissimilarities in the LSH values of the other KVs. Each component holds key values with similar LSH values and therefore one or more indexes associated with the similar LSH values.

As discussed above, embodiments of the disclosure may be implemented using computing devices. FIG. 4 shows a diagram of a computing device in accordance with one or more embodiments disclosed herein. The computing device may include one or more computer processor(s) (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the disclosure, the processor(s) (402) may be an integrated circuit for processing instructions. For example, the computer processor(s) may be one or more cores or micro-cores of a processor. The computing device may also include one or more input devices (410), such as a touchscreen, keyboard, mouse, microphone, touchpad, electronic pen, or any other type of input device. Further, the communication interface (412) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for storing data in a parallel file system (PFS), comprising:
- receiving, at a PFS client, a plurality of key value entries created by an artificial intelligence (AI) application;
- calculating, by the PFS client, a plurality of locality sensitive hash values for the plurality of key value entries;
- creating, at the PFS client, a distribution of the plurality of key value entries based on the plurality of locality sensitive hash values, wherein the distribution groups key value entries of the plurality of key value entries together with similar locality sensitive hash values;
- storing the plurality of key value entries in a plurality of components of the PFS based on the distribution, wherein a first key value entry of the plurality of key value entries is stored in a first component of the PFS based on the distribution;
- after storing the first key value entry:
  - receiving, at the PFS, a load request for the first key value entry after storing the first key value entry;
  - making a first determination, after receiving the load request, that the first key value entry is stored in the first component; and
  - loading, in response to the first determination, at the PFS, a first portion of the plurality of key value entries stored in the first component including the first key value entry.

2. The method of claim 1, wherein the plurality of key value entries each comprises a token and a vector and wherein the token is a key to the vector that contains a value.

3. The method of claim 2, wherein the plurality of key value entries is used in an AI inferencing operation of the AI application and are stored in the PFS to avoid recalculation of each token and each vector.

4. The method of claim 1, further comprising:
- receiving, at the PFS, a second load request for a second key value entry of the plurality of key value entries;
- making a second determination, in response to the second load request, that the second key value entry is stored in the first component with the first key value entry based on the distribution; and
- loading, in response to the second determination, at the PFS, the first portion of the plurality of key value entries stored in the first component including the second key value entry and the first key value entry.

5. The method of claim 1, further comprising:

receiving, at the PFS, a second load request for a second key value entry of the plurality of key value entries;

making a third determination, in response to the second load request, that the second key value entry is stored in a second component; and loading, in response to the third determination, at the PFS, a second portion of the plurality of key value entries stored in the second component.

6. The method of claim 1, wherein the plurality of locality sensitive hash values identifies similar key value entries in the plurality of key value entries.

7. The method of claim 1, wherein the AI application operates in an AI server with the PFS client.

8. The method of claim 1, further comprising:

transmitting the key value entries stored in the first component including the first key value entry to the PFS client, wherein the key value entries are used by the AI application for an AI inferencing operation.

9. A non-transitory computer readable medium (CRM) comprising computer readable program code, which when executed by a computer processor enables the computer processor to perform a method for storing data in a parallel file system (PFS), the method comprising:

receiving, at a PFS client, a plurality of key value entries created by an artificial intelligence (AI) application;

calculating, by the PFS client, a plurality of locality sensitive hash values for the plurality of key value entries;

creating, at the PFS client, a distribution of the plurality of key value entries based on the plurality of locality sensitive hash values, wherein the distribution groups key value entries of the plurality of key value entries together with similar locality sensitive hash values;

storing the plurality of key value entries in a plurality of components of the PFS based on the distribution, wherein a first key value entry of the plurality of key value entries is stored in a first component of the PFS based on the distribution;

after storing the first key value entry:

receiving, at the PFS, a load request for the first key value entry after storing the first key value entry;

making a first determination, after receiving the load request, that the first key value entry is stored in the first component; and loading, in response to the first determination, at the PFS, a first portion of the plurality of key value entries stored in the first component including the first key value entry.

10. The non-transitory CRM of claim 9, wherein the plurality of key value entries each comprises a token and a vector and wherein the token is a key to the vector with a value.

11. The non-transitory CRM of claim 10, wherein the plurality of key value entries is used in an AI inferencing operation of the AI application and are stored in the PFS to avoid recalculation of each token and each vector.

12. The non-transitory CRM of claim 9, further comprising:

receiving, at the PFS, a second load request for a second key value entry of the plurality of key value entries;

making a second determination, in response to the second load request, that the second key value entry is stored in the first component with the first key value entry based on the distribution; and loading, in response to the second determination, at the PFS, the first portion of the plurality of key value entries stored in the first component including the second key value entry and the first key value entry.

13. The non-transitory CRM of claim 9, further comprising:

receiving, at the PFS, a second load request for a second key value entry of the plurality of key value entries;

making a third determination, in response to the second load request, that the second key value entry is stored in a second component; and loading, in response to the third determination, at the PFS, a second portion of the plurality of key value entries stored in the second component.

14. The non-transitory CRM of claim 9, wherein the plurality of locality sensitive hash values identifies similar key value entries in the plurality of key value entries.

15. The non-transitory CRM of claim 9, further comprising:

transmitting the key value entries stored in the first component including the first key value entry to the PFS client, wherein the key value entries are used by the AI application for an AI inferencing operation.

16. A system comprising:

a parallel file system (PFS);

a PFS client;

at least one processor;

storage comprising instructions, which when executed by the processor perform a method for storing data in the PFS, the method comprising:

receiving, at the PFS client, a plurality of key value entries created by an artificial intelligence (AI) application;

calculating, by the PFS client, a plurality of locality sensitive hash values for the plurality of key value entries;

creating, at the PFS client, a distribution of the plurality of key value entries based on the plurality of locality sensitive hash values, wherein the distribution groups key value entries of the plurality of key value entries together with similar locality sensitive hash values;

storing the plurality of key value entries in a plurality of components of the PFS based on the distribution, wherein a first key value entry of the plurality of key value entries is stored in a first component of the PFS based on the distribution;

after storing the first key value entry:

receiving, at the PFS, a load request for the first key value entry after storing the first key value entry;

making a first determination, after receiving the load request, that the first key value entry is stored in the first component; and loading, in response to the first determination, at the PFS, a first portion of the plurality of key value entries stored in the first component including the first key value entry.

17. The system of claim 16, wherein the plurality of key value entries each comprises a token and a vector and wherein the token is a key to the vector with a value.

18. The system of claim 17, wherein the plurality of key value entries is used in an AI inferencing operation of the AI application and are stored in the PFS to avoid recalculation of each token and each vector.

19. The system of claim 16, wherein the plurality of locality sensitive hash values identifies similar key value entries in the plurality of key value entries.

20. The system of claim 16, further comprising:

transmitting the key value entries stored in the first component including the first key value entry to the PFS client, wherein the key value entries are used by the AI application for an AI inferencing operation.

* * * * *